(12) United States Patent
Clüsserath et al.

(10) Patent No.: US 11,407,628 B2
(45) Date of Patent: Aug. 9, 2022

(54) FILLING SYSTEM FOR FILLING CONTAINERS WITH A FLUID FILLING MATERIAL AND FILLING MACHINE

(71) Applicant: KHS GmbH, Dortmund (DE)

(72) Inventors: Ludwig Clüsserath, Bad Kreuznach (DE); Jochen Ohrem, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 17/281,051

(22) PCT Filed: Oct. 10, 2019

(86) PCT No.: PCT/EP2019/077476
§ 371 (c)(1),
(2) Date: Mar. 29, 2021

(87) PCT Pub. No.: WO2020/083654
PCT Pub. Date: Apr. 30, 2020

(65) Prior Publication Data
US 2021/0354969 A1    Nov. 18, 2021

(30) Foreign Application Priority Data
Oct. 23, 2018   (DE) ..................... 10 2018 126 303.1

(51) Int. Cl.
*B67C 3/28*   (2006.01)
*B67C 3/26*   (2006.01)
(Continued)

(52) U.S. Cl.
CPC ................ *B67C 3/284* (2013.01); *B65B 3/04* (2013.01); *B65B 3/26* (2013.01); *B67C 3/26* (2013.01); *G01F 23/284* (2013.01); *G01S 13/88* (2013.01); *B67C 2003/2651* (2013.01); *B67C 2003/2685* (2013.01)

(58) Field of Classification Search
CPC ........... B67C 3/284; B67C 3/26; B67C 3/007; B67C 2003/2651; B67C 2003/2685; B65B 3/04; B65B 3/26; G01F 23/284; G01S 13/88
See application file for complete search history.

(56) References Cited

U.S. PATENT DOCUMENTS 5,070,730 A * 12/1991 Edvardsson .......... G01S 13/862
367/908
5,438,867 A *  8/1995 van der Pol .......... G01F 23/284
342/124

(Continued)

FOREIGN PATENT DOCUMENTS

DE          3605748 A1    8/1987
DE          4239954 A1    6/1994
(Continued)

*Primary Examiner* — Nicolas A Arnett
(74) *Attorney, Agent, or Firm* — Occhiuti & Rohlicek LLP

(57) ABSTRACT

A filling element includes a radar for measuring fill level in a container during filling thereof and an antenna connected to the radar. The antenna is disposed along a flow path formed in a gas pipe that forms a flow path for fluid while the container is being filled. The antenna provides the radar with a signal indicative of a measurement of a level of the filing material in the container.

11 Claims, 4 Drawing Sheets

(51) Int. Cl.
   *G01F 23/284*    (2006.01)
   *G01S 13/88*     (2006.01)
   *B65B 3/26*      (2006.01)
   *B65B 3/04*      (2006.01)

(56) References Cited

U.S. PATENT DOCUMENTS

| | | | |
|---|---|---|---|
| 5,799,534 A * | 9/1998 | van der Pol | G01S 13/343 |
| | | | 73/290 V |
| 6,394,153 B2 | 5/2002 | Skell et al. | |
| 6,828,930 B2 * | 12/2004 | Hagg | G01F 23/284 |
| | | | 73/304 C |
| 6,988,404 B2 * | 1/2006 | Motzer | B08B 9/0436 |
| | | | 73/304 R |
| 8,881,588 B2 * | 11/2014 | Baer | H01Q 19/08 |
| | | | 73/293 |
| 2003/0010116 A1 * | 1/2003 | Cavazzin | G01F 23/284 |
| | | | 73/290 V |
| 2010/0071802 A1 * | 3/2010 | Clusserath | B65B 39/001 |
| | | | 141/46 |
| 2010/0321262 A1 * | 12/2010 | Pohl | H01Q 15/08 |
| | | | 343/753 |

FOREIGN PATENT DOCUMENTS

| | | |
|---|---|---|
| DE | 102008008715 A1 | 8/2009 |
| DE | 102016112146 B3 | 8/2017 |
| EP | 0591816 A2 | 4/1994 |
| EP | 2942322 A1 | 11/2015 |
| WO | 0163223 A2 | 8/2001 |

* cited by examiner

FILLING SYSTEM FOR FILLING CONTAINERS WITH A FLUID FILLING MATERIAL AND FILLING MACHINE

RELATED APPLICATIONS

This is the national stage of international application PCT/EP2019/077476, filed on Oct. 10, 2019, which claims the benefit of the Oct. 23, 2018 priority date of German application 102018126303.1, the contents of which are incorporated herein by reference.

FIELD OF INVENTION

The invention relates to filling systems, and in particular, to ensuring that all containers have the same fill level.

BACKGROUND

When filling containers for consumer products, it is common to place the same amount of liquid in each container. If the containers are all identical, the levels will all be the same. This presents a uniform appearance that is aesthetically desirable.

In some cases, the containers are not uniform. This may arise when recycled plastic containers have been used. As a result of recycling, there may be minor deformations in the plastic. Although the deformations are small, they are enough to cause the same volume to reach different fill levels in different containers. Even though the actual volumes are the same, this results in complaints.

To avoid this difficulty, it is desirable to add extra liquid to assure that each container contains the promised volume and that each container also reaches the same filling level. Since every container is deformed differently, it is difficult to know how much liquid filling material to add for a given container.

SUMMARY

An object of the invention is that of providing a filling system for the filling of containers with a fluid filling material with the same filling level while ensuring an adequate volume of filling material. This results in a filling height that is reliably detected regardless of the capacity of the filling machine that is currently being run. As a result, the container be filled with an adequate quantity of fluid filling material up to the required fill level.

In one aspect, the invention relates to a filling system for the filling of containers with a liquid filling material. The system comprises at least one filling material tank that provides providing the filling material and a filling element for the controlled output of the filling material into a container arranged in a sealing position at the filling element during a filling phase.

The filling element according to the invention further comprises, in a filling element housing, a fluid channel through which the fluid filling material can flow and in which a fluid valve is provided, the valve body of which can be shifted in a controlled manner along a filling-element axis for opening and/or closing the fluid valve. The valve body is formed on a gas pipe that is axially aligned with the filling element axis and acts as a valve tappet.

With the inclusion of the gas pipe, a flow path is formed for a liquid and/or gaseous medium, which at least during the filling phase is in connection with the interior of the container that is to be filled.

The apparatus includes an antenna of a radar filling level measuring device. The antenna is provided in the flow path for determining the filling height of the fluid filling material being filled into the container. This allows for a precise filling of fluid filling material even into containers of different shapes and internal volumes that differ from one another. This is due to the fact that the determination of the filling height by the radar filling level measuring device is not influenced by the consistency of the container that is to be filled. And specifically, the measurement is not influenced by the fact that the signals transmitted and received by the antenna do not penetrate through the container but pass unhindered through the container mouth onto the filling material and reflect therefrom.

The antenna of the radar filling level measuring device, operating on the radar-measuring principle, is configured for the sending and/or receiving of radar signals. For this purpose, transmitted signals are sent via a transmitting device of the antenna in the direction of the filling material, then reflected from filling material, and the response signals reflected in this way are received by a receiver device of the antenna, and, on the basis of the signals, the filling level of the fluid filling material can be determined.

Inasmuch as the antenna is provided in the flow path, which is directly accessible during the filling process, in the direction of the container which is being filled, the signals of the antenna produced and received in this way can pass unhindered and in a direct manner from the antenna in the direction of the fluid filling material being filled, reflected from this, and are again received by the antenna.

In some embodiments, the antenna is configured for sending and/or receiving radar signals.

In other embodiments, the antenna is configured to send transmission signals, via a transmitting device, in the direction of the fluid filling material being filled by way of a mouth opening of the container and the response signals reflected from the filling material are received by a reception device of the antenna, and, on the basis of the signals, the filling level of the fluid filling material is determined.

In still other embodiments, the transmitting and receiving device of the antenna to be directed with a main beam direction in the flow path directly and preferably perpendicularly onto the surface level of the filling material in the respective container.

Also among the embodiments are those in which the antenna is located in the flow path and the further electronic components of the radar filling level measuring device are located in a common housing outside the filling element housing.

Among the embodiments are those in which the antenna is configured as a drop antenna.

According to another advantageous embodiment variant, provision can be made in this situation for the radar filling level measuring device to be capable of being operated at a frequency greater than eighty gigahertz.

In still other embodiments, the radar filling level measuring devices, together with the first and/or second control valve and the actuating device for the valve body formed at the gas pipe, and a regulating and control device, form a control circuit.

In some embodiments, the control circuit is configured such that, by means of the radar filling level measuring device, and in accordance with the radar measuring principle, an actual filling level height can be detected, and compared with a reference filling level height stored in the regulating and control device, and from a possible deviation to produce a signal which the control and regulating device then delivers to the filling element, in order then to arrange for the filling of the respective container required to make up the deviation between the actual filling level height and the reference filling level height, until the reference filling level height is reached. In particular, for this purpose the regulating and control device can control and/or regulate the first and/or second control valve and/or third control valve, as well as the actuating device for the valve body formed at the gas pipe.

In some embodiments, the control circuit is configured to control and/or regulate the filling speed as a function of the actual filling level height detected by the radar filling level measuring device. For example, a profile for the reference filling speed can be stored in a machine control device, wherein, at least for some reference filling levels, in each case an allocated reference filling speed and/or a reference opening degree of the individual fluid valve of the filling valve can be stored. For example, for an actual filling level height between zero and fifteen millimeters, a very low reference filling speed can be stored, and for an actual filling level height of between fifteen and one hundred eighty millimeters a very high reference filling speed.

In some embodiments, the antenna of the radar filling level measuring device is provided in the flow path inside the gas pipe.

In some embodiments, the antenna is accommodated in the gas pipe, with its main beam direction directed perpendicularly onto the filling material level of the container.

In some embodiments, the antenna is arranged inside the gas pipe in the region of the lower open end.

In some embodiments, the antenna is arranged inside the gas pipe approximately midway between the lower open end and the upper open end.

In some embodiments, the antenna is arranged inside the gas pipe in the region of the upper open end.

In some embodiments, the antenna is located in the gas chamber above the gas pipe, in such a way that the main beam direction of the transmitting and receiving device inside the gas pipe is directed along the filling element axis as well as perpendicularly onto the filling material level.

The expression "essentially" or "approximately" signifies in the meaning of the invention deviations from the respective exact value by +/10%, preferably by +/−5%, and/or deviations in the form of changes which are not of significance for the function.

Further embodiments, advantages, and possible applications of the invention are also derived from the following description of exemplary embodiments and from the figures. In this context, all the features described and/or represented in the figures are in principle the object of the invention, alone or in any desired combination, regardless of their arrangement in the claims or reference to them. The contents of the claims are also rendered as a constituent part of the description.

Although numerous aspects have been described in connection with a filling machine, it is understood that these aspects also represent a description of the corresponding filling process, such that a block element or structural element of a device is also to be understood as a corresponding method step or as a feature of a method step. By analogy with this, aspects which have been described in connection with or as a method step also represent a description of a corresponding block or detail or feature of a corresponding device. Some or all of the method steps can be carried out by a hardware device (or by making use of a hardware device), such as, for example, a microprocessor, a programmable computer, or an electronic circuit. With some exemplary embodiments, some or many of the most important method steps can be carried out by such a device.

BRIEF DESCRIPTION OF THE FIGURES

The invention is explained in greater detail hereinafter on the basis of the Figures in reference to exemplary embodiments. The Figures show:

FIG. 1b is an enlarged view of a portion of the filling element shown in FIG. 1a;

For the elements of the invention which are the same or of the same effect, identical reference numbers are used in the figures. Moreover, for an easier overview, only those reference numbers are represented in the individual figures that are required for the description of the respective figure.

DETAILED DESCRIPTION

Figure 1A:
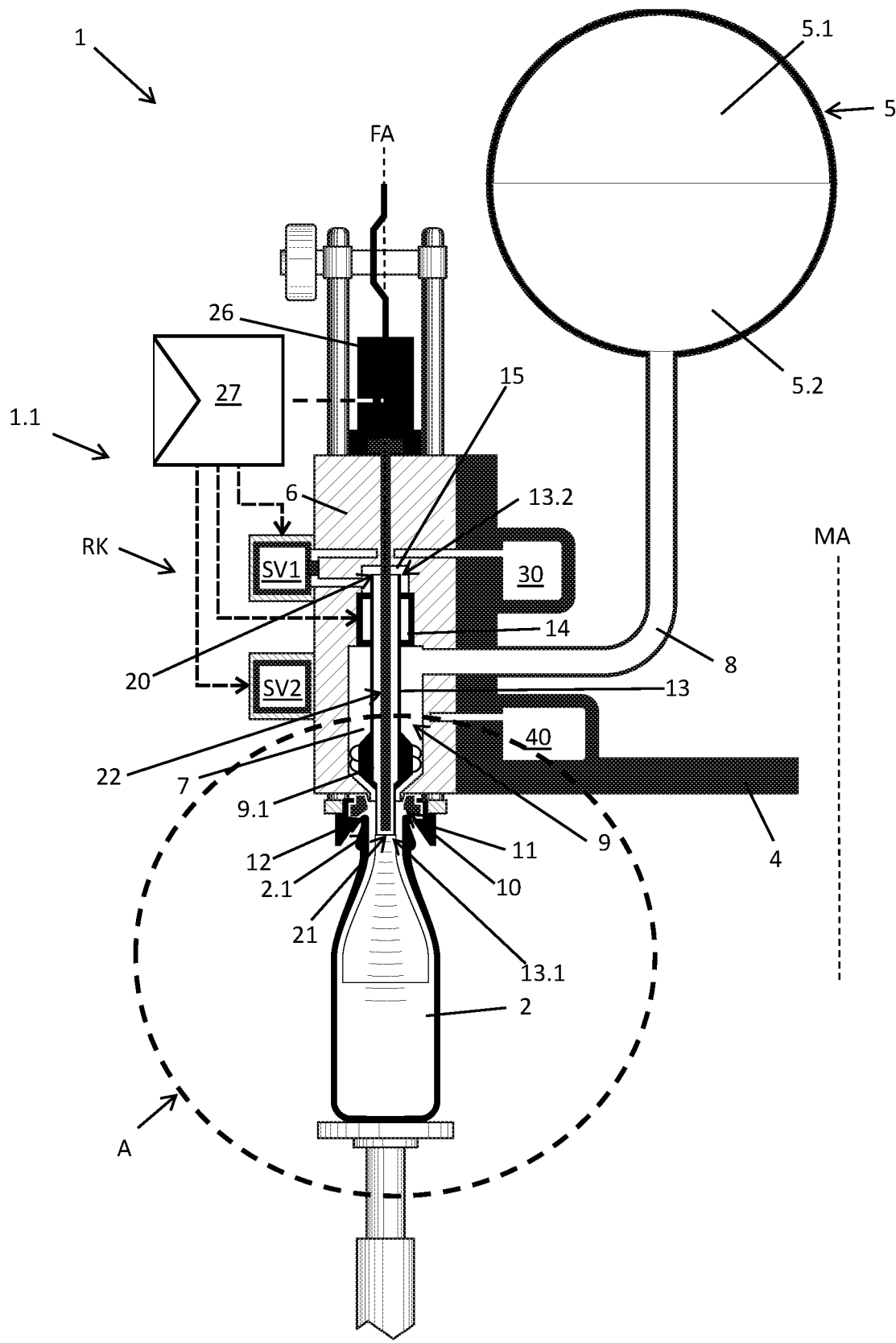
FIG. 1a shows a sectional view of a filling element.
Figure 1B:
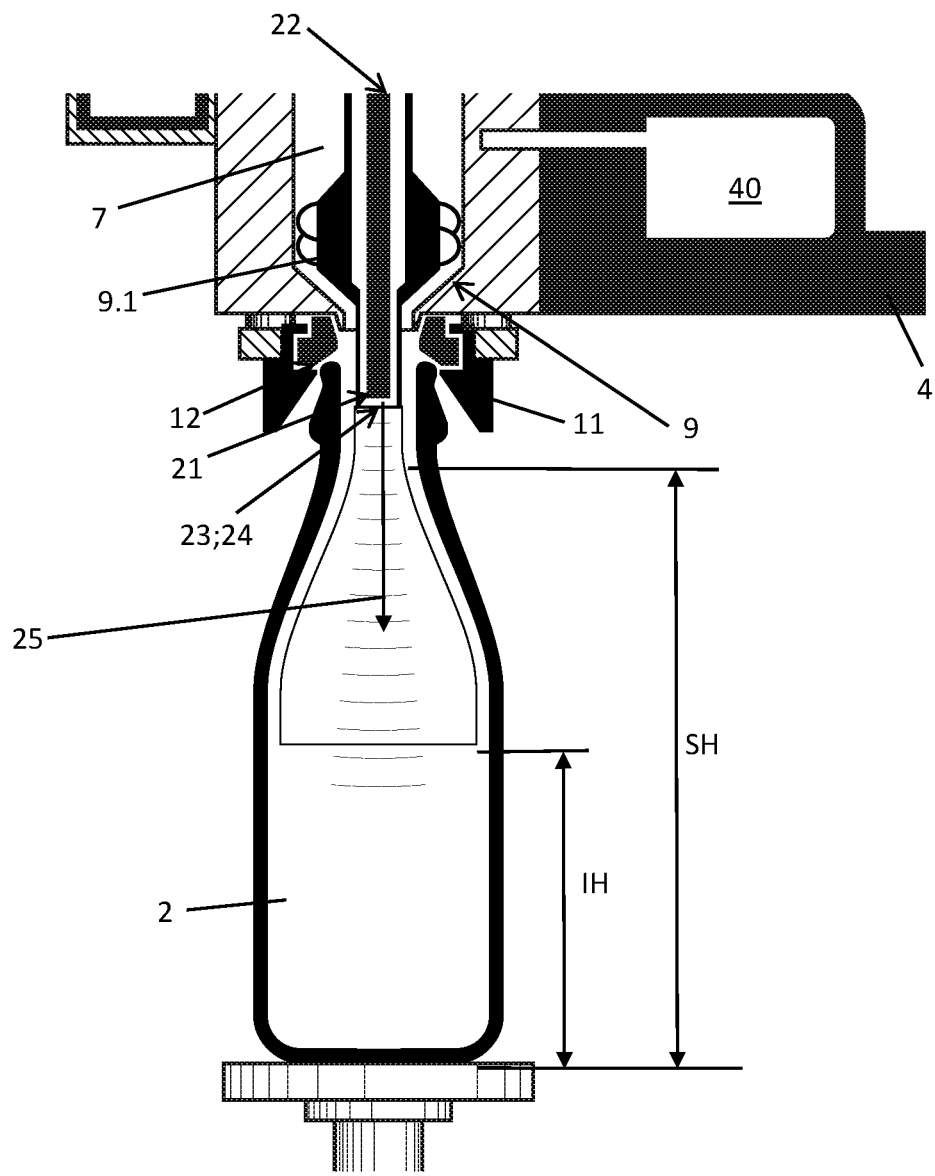

FIG. 1 shows one of many filling elements 1.1 of a filling system 1 that is part of a rotating filling machine for filling bottles 2 or similar containers with a liquid filling-material. The filling system 1 is configured for free=jet filling, filling over a container wall, or longitudinal pipe filling.

The filling elements 1.1 are arranged at uniform angular distances along the circumference of a rotor 4 of the filling machine. Each filling element 1.1 extends along a filling-element axis FA. The rotor 4 rotates about a vertical machine axis MA.

A ring tank 5 located at the rotor 4 provides filling material to all the filling elements 1.1. During operation, the ring tank 5 is partially filled with filling material up to some predetermined level, which is controlled so as to remain constant. The rotor 4 also supports first and second ring channels 30, 40 that are common to all filling elements 1.1 of the filling machine.

During filling, there exists an upper gas space 5.1 and a lower liquid space 5.2 in the tank 5. When the filling machine is used for pressurized filling, an inert gas under pressurizes the gas space 5.1 to a controlled filling pressure. A typical inert gas is carbon dioxide. A supply line, which has been omitted for clarity, conveys filling material to the tank 5 so as to maintain a constant level.

The first and second ring channels 30, 40 carry out various functions depending on the nature of the filling process. In some cases, the first ring channel 30 carries a pressurized inert gas for pre-stressing or flushing the container. In some embodiments, the second ring channel 40 is a vacuum channel for evacuating containers or providing pressure relief.

The filling element 1.1 includes a filling-element housing 6 in which is formed a fluid channel 7. A line 8 connects the fluid channel 8 to the liquid space 5.2. A fluid channel 7 formed within the filling-element housing 6 connects to the tank's liquid space 5.2 via a line 8.

A valve 9 located in the fluid channel 7 controls output of filling material through an annular output opening 10 that is concentric with the filling-element axis FA and disposed on an underside of the filling element 1.1. An open end of the fluid channel ends at the output opening 10.

A centering bell 11 at the output opening 10 includes a seal 12 that surrounds the output opening 10. During pressure filling, a container is pressed against the seal 12 so that its mouth 2.1 is sealed at the output opening 10.

The valve 9 comprises a valve body 9.1 that is arranged in the fluid channel 7. The valve body 9.1 interacts with a valve seat that is formed on an inner surface of the fluid channel 7.

In some embodiments, the valve body 9.1 is provided or formed at a gas pipe 13 that is coaxial with the filling-element axis FA and open at upper and lower ends 13.2, 13.1 thereof. An actuator 14 coupled to the gas pipe 13 moves it up and down by a predetermined axial lift stroke along the filling-element axis FA. As a result, the valve body 9.1. can be moved up and down for opening and closing the valve 9. The gas pipe 13 thus serves as a valve tappet for opening and closing the valve 9.

During filling, the gas pipe's lower end 13.1 projects through the output opening 11 and reaches into the container's interior, into what will become the head space. The gas pipe's upper end 13.2 extends into a closed gas space 15.

When filling a container 2, a flow path 20 formed in the filling element 1.1 connects to the container's interior. The flow path 20 provides a way to return gas displaced from the container 2 during filling and to return displaced filling material back to the tank 5. It also provides a way to convey flushing gas out of the container 2. The flow path 20 is thus part of a gas-channel system.

By using a first control valve SV1, it is possible to place the flow path 20 in connection with the container's interior via the gas pipe 13. In this state, the flow path 20 extends from the first ring channel 30, through the first control-valve SV1, through the gas pipe 13, and into the container's interior.

A second control-valve SV2 connects the second ring channel 40 to the flow path 20 in a similar manner.

The filling element 1.1 further includes a radar 22 connected to an antenna 21 for determining the level of liquid in the container 2 during filling. A transmitter 23 transmits a transmitted wave using the antenna 21 in a direction towards the liquid's surface through the container's mouth opening 2.1. A receiver 24, which is also connected to the antenna 21, receives a reflected wave from the filling material. The delay associated with receiving the reflected wave provides a way to estimate the fill level of the container 2.

The antenna 21 has a main beam 25 that is directed along the flow path 20 to illuminate the surface of the filling material in the container 2. This main beam 25 radiates most of the available electromagnetic energy. Preferably, the direction of the main beam 25 is perpendicular to the filling material's surface.

With the antenna 21 being arranged in the flow path 20, there are no obstructions along the path traversed by the transmitted and reflected waves. As such, both waves propagate unhindered.

In a preferred embodiment, certain ones of the radar's electronic components are disposed in a housing 26 outside the filling element 1.1 Such electronic components include an energy source, a pulse generator, or radar-measurement converter. The antenna 21 is thus disposed to be separated from the other components of the radar 22.

The transmitter 23 comprises a feed, the details of which have been omitted. The transmitter 23 illuminates a lens of the antenna with electromagnetic radiation. The antenna 21 is shaped to achieve a specified radiation pattern.

In a preferred embodiment, the antenna 21 is a drop antenna. A drop antenna includes a lens having an ellipsoidal surface that causes waves incident thereon to radiate according to a particular radiation pattern. A suitable drop antenna is that described in DE 10 2008 008 715, the contents of which are incorporated herein by reference.

The relative locations of the lens and feed element are such as to cause a planar phase front along the direction of the main beam 25.

The width of the main beam 25 can be decreased by increasing the frequency of the radiated wave. A suitable frequency is one above eighty gigahertz and preferably one above 120 gigahertz.

In some embodiments, a regulator 27 controls one or both of the first and second control valves SV1, SV2 as well as the actuator 14. In such embodiments, the radar 22, the first and/or second control valve SV1, SV2, the actuator 14 for the valve body 9.1, and the regulator 27 form a control circuit RK. The control circuit RK uses the radar 22 to measure a fill level IH and to compare this measured filling level IH with a reference fill level SH that has been stored in the regulator 27.

The control circuit RK then produces a deviation signal that is indicative of a deviation between the measured fill level IH and the reference fill level SH. This deviation signal is then used as a basis for adding filling material to the container 2 to make up the difference between the actual fill level IH and the reference fill level SH.

In a preferred embodiment, the antenna 21 is provided in the flow path 20 inside the gas pipe 13. The antenna 21 is arranged, in the gas pipe 13 along the filling element axis FA. It is particularly useful for the antenna 21 to be accommodated in the gas pipe 13 with its main beam 25 directed perpendicular to the surface of the filling material in the container 2.

Figure 2:
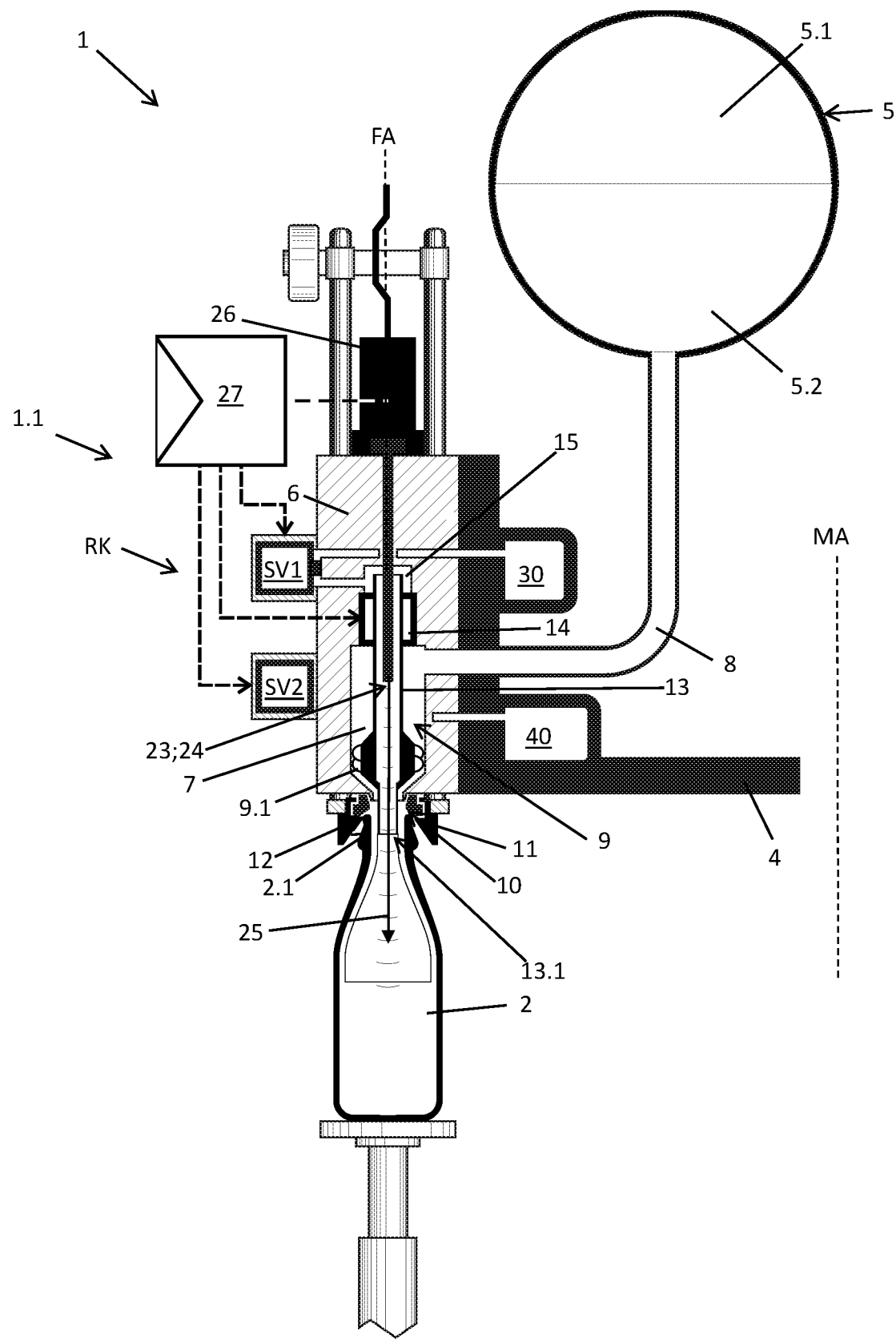
FIG. 2 shows a sectional view of second embodiment of a filling element.

In the embodiment shown in FIG. 1a, the antenna 21 is arranged inside the gas pipe 13 at or proximate to its lower end 13.1, which is open. In a preferred embodiment, the antenna 21 is between zero and five centimeters from the lower end 13.1 with its main beam 25 pointed directly at the surface of the filling material. In an alternative embodiment, which in FIG. 2, the antenna 21 is arranged inside the gas pipe 13 approximately midway between the lower end 13.1 and the upper end 13.2.

In another embodiment, the antenna 21 is arranged inside the gas pipe 13 at or proximate to its upper end 13.2, which is open. In a preferred embodiment, the antenna 21 is between zero and five centimeters from the upper end 13.2 with its main beam 25 pointed directly at the surface of the filling material.

Figure 3:
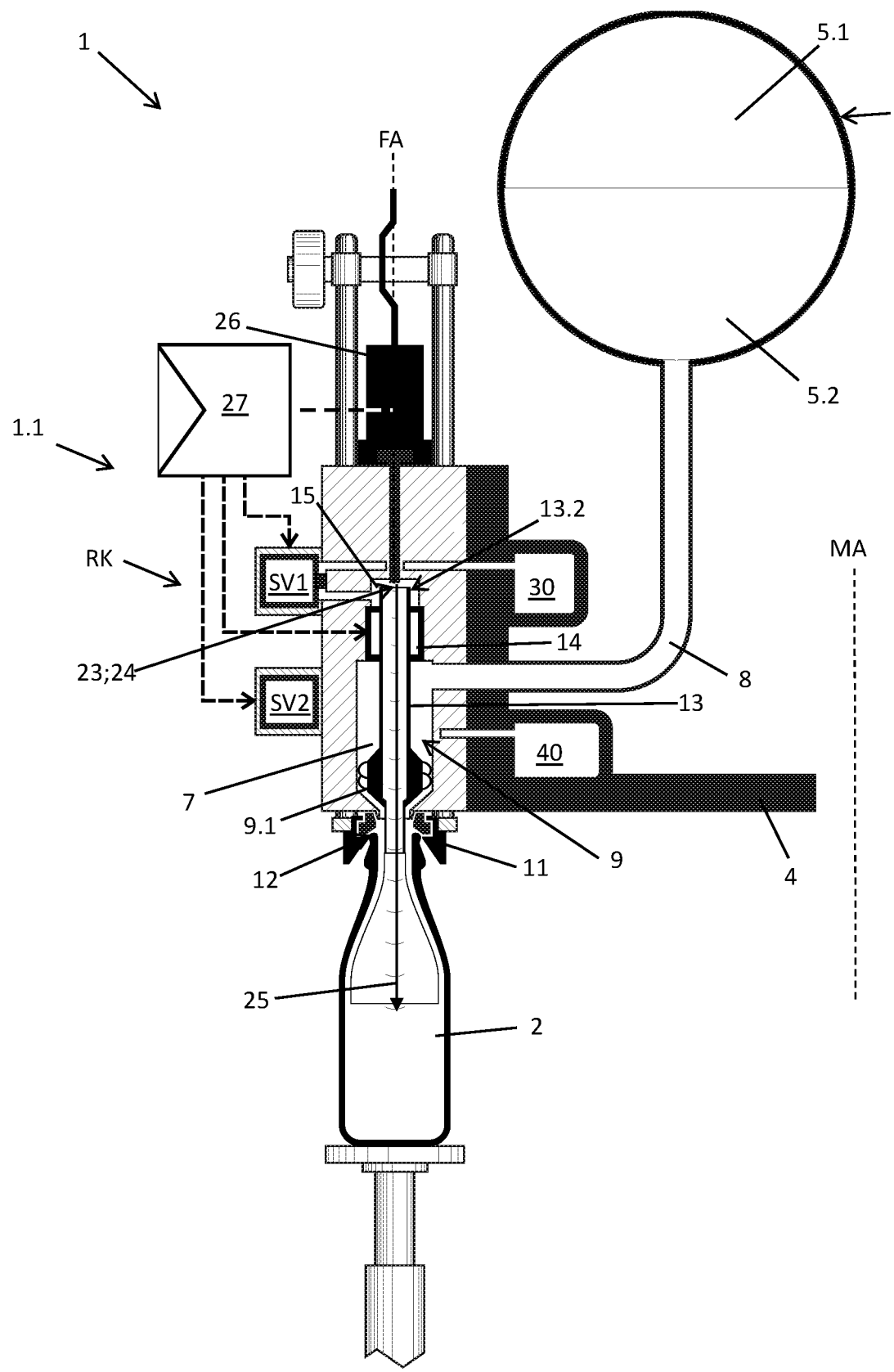
FIG. 3 shows a sectional view of a third embodiment of a filling element.

In the embodiment shown in FIG. 3, the antenna 21 is arranged in the gas space 15 above the gas pipe 13 in such a way that the main beam 25 is directed is directed along the filling element axis FA in a direction perpendicular to the surface of the filling material in the container 2. as well as perpendicularly onto the filling material level.

The invention has been described heretofore by way of exemplary embodiments. It is understood that a number of modifications or derivations are possible without thereby departing from the scope of protection of the invention defined by the claims.

Having defined the invention and a preferred embodiment thereof, what is claimed as new and secured by Letters Patent is:

1. An apparatus comprising a source of filling material and a filling element for controlled output of said filling material into a container that is sealed against said filling element during a filling phase, said source being one of a tank and a pipe, wherein said filling element extends along a filling-element axis and comprises a filling-element housing, a channel through which said filling material flows, said channel being formed in said filling-element housing, a gas pipe aligned with said filling-element axis, said gas pipe forming a flow path for fluid, said flow path being connected, during said filling phase, with said container's interior, a valve arranged along said channel, said valve comprising a valve body that is shifted in a controlled manner along said filling-element axis for causing said valve to transition between an open state and a closed state, said valve body being formed in said gas pipe, which acts as a valve tappet, a radar for measuring fill level in said container during filling thereof, and an antenna connected to said radar, said antenna being disposed along said flow path for providing said radar with a signal indicative of a measurement of a level of said filing material in said container, wherein said gas pipe has a lower end that is open and said antenna is arranged inside said gas pipe at said lower end.

2. The apparatus of claim 1, wherein said antenna is configured for the transmitting and receiving radar signals.

3. The apparatus of claim 1, further comprising a transmitter and a receiver, wherein said transmitter causes said antenna to transmit a first signal towards said filling material entering said container via a mouth opening thereof and wherein said receiver is configured to determine a fill level of fluid in said container based on a second signal, said second signal resulting from reflection of said first signal by said filling material.

4. The apparatus of claim 1, wherein said antenna is oriented such that a main beam thereof is pointed along said flow path in a direction perpendicular to a surface formed by said filling material in said container.

5. The apparatus of claim 1, further comprising a common housing outside said filling-element housing, wherein said common housing houses electronic components of said radar, and wherein said antenna is arranged in said flow path.

6. The apparatus of claim 1, wherein said antenna comprises a drop antenna.

7. The apparatus of claim 1, wherein said radar is configured to operate at a frequency greater than eighty gigahertz.

8. The apparatus of claim 1, further comprising a control circuit, said control circuit comprising first and second control valves, an actuator that actuates the valve body, a regulator, and said radar.

9. The apparatus of claim 8, wherein said control circuit is configured to use said radar to obtain a measured fill level in said container and to compare said measured fill level with a reference fill level stored in said regulator, wherein said control circuit is further configured to generate a deviation signal indicative of a deviation between said measured fill level and said reference fill level and to provide said deviation signal to said regulator, wherein, in response to receiving said deviation signal, said regulator controls said first and second control valves and said actuator.

10. The apparatus of claim 1, wherein said antenna is oriented so that a main beam thereof is directed along a direction that is perpendicular to a surface formed by said filling material within said container.

11. The apparatus of claim 1, further comprising a rotor that is drivable about a vertical machine axis, wherein said filling element is one of a plurality of filling elements disposed along a circumference of said rotor.

* * * * *